United States Patent [19]

Wadman

[11] Patent Number: 5,460,451
[45] Date of Patent: Oct. 24, 1995

[54] PYROMETER INCLUDING AN EMISSIVITY METER

[75] Inventor: Sipke Wadman, Eindhoven, Netherlands

[73] Assignee: U.S. Philips Corporation, New York, N.Y.

[21] Appl. No.: 173,840

[22] Filed: Dec. 27, 1993

[30] Foreign Application Priority Data

Dec. 29, 1992 [EP] European Pat. Off. ............. 92204102

[51] Int. Cl.⁶ ................................. G01J 5/08; G01J 5/06; G01N 25/00
[52] U.S. Cl. ...................... 374/126; 219/502; 219/85.12; 374/128; 374/9; 374/13; 374/131; 374/141
[58] Field of Search ............................ 374/126, 9, 128, 374/130, 131, 141; 250/338.1, 341; 356/43, 44, 45; 219/502, 85.12, 85.13; 392/416, 418

[56] References Cited

U.S. PATENT DOCUMENTS

| | | | |
|---|---|---|---|
| 3,796,099 | 3/1974 | Shimotsuma | 374/9 |
| 4,479,055 | 10/1984 | Perten | 250/338.1 |
| 4,919,542 | 4/1990 | Nulman et al. | 374/126 |
| 4,956,538 | 9/1990 | Moslehi | 374/126 |
| 4,979,134 | 12/1990 | Arima et al. | 374/126 |
| 5,098,195 | 3/1992 | Halyo et al. | 374/9 |
| 5,239,488 | 8/1993 | Markham et al. | 374/9 |
| 5,282,017 | 1/1994 | Kasindorf et al. | 356/43 |
| 5,308,161 | 5/1994 | Stein | 250/341 |
| 5,326,173 | 7/1994 | Evans et al. | 374/126 |

FOREIGN PATENT DOCUMENTS

| | | | |
|---|---|---|---|
| 0161521 | 10/1982 | Japan | 374/126 |
| 0621882 | 4/1949 | United Kingdom | 374/126 |
| 1436180 | 5/1976 | United Kingdom | 374/126 |

OTHER PUBLICATIONS

Krapez, J. C. et al., "A double-wedge reflector for emissivity enhanced pyrometry," Meas. Sci. Technol. 1, pp. 857–864 (1990).

"Der Pyrolaser" R. Porter, Sensor Magazine No. 3, 1990, pp. 13–17.

Primary Examiner—Diego F. F. Gutierrez
Attorney, Agent, or Firm—Paul R. Miller

[57] ABSTRACT

A pyrometer for measuring thermal radiation and emissivity for both diffusely and specularly reflecting surfaces of an object which includes, a thermal radiation detector and an optical system connected to the detector for concentrating thermal radiation originating from an object surface area on the detector, an emissivity meter connected to the optical system, the meter further comprising a radiation source supplying measuring radiation and a measuring radiation detector, an optical integrator adjacent to the object surface area arranged in the radiation path of the measuring radiation between the radiation source and the measuring radiation detector, wherein the radiation source extends through an aperture of the optical integrator and diffusely irradiates the object surface, and a shield connected to the optical integrator for preventing measuring radiation from irradiating the object surface area directly, is described. A laser processing apparatus provided with such a pyrometer and a method of controlling the temperature of a surface with the pyrometer are also described.

11 Claims, 2 Drawing Sheets

PYROMETER INCLUDING AN EMISSIVITY METER

BACKGROUND OF THE INVENTION

The invention relates to a pyrometer comprising a thermal radiation detector and an optical system for concentrating thermal radiation originating from an object surface area on the detector, said pyrometer being further provided with an emissivity meter comprising a radiation source supplying measuring radiation and a measuring radiation detector for convening the measuring radiation reflected by the surface into an electric signal. The invention also relates to a laser processing apparatus provided with such a pyrometer and to a method of controlling the temperature of a surface by means of the pyrometer.

A pyrometer measures the temperature of an object by measuring the quantity of thermal radiation from an object surface and convening it into a temperature of the surface. The relation between the quantity of thermal radiation and the temperature is dependent, inter alia, on the emissivity of the surface. The lower the emissivity of the surface, the less thermal radiation the surface emits at a given temperature. For a correct determination of the temperature it is thus necessary to know the emissivity value. In many processes in which temperatures are measured, reasonably invariable conditions prevail, such as, for example in ovens, and the emissivity has a constant value. Consequently, its value is to be determined only once. In processes in which considerably varying temperatures are used, for example in laser soldering, the emissivity varies during the process. This variation may be caused by a change of colour of the surface during the process or by a change of the roughness of the surface due to, for example melting of this surface, or by chemical changes, or only by the variation of the surface temperature. To perform a correct temperature measurement in such processes, the emissivity of the surface is to be measured simultaneously with the measurement of thermal radiation. For a correct determination of the temperature, the emissivity must be measured at the same wavelength position at which the thermal radiation is measured. For measuring the emissivity the the emissivity value is generally taken to be equal to 1 minus the value of the reflection coefficient, provided that the surface has a low transmission.

A pyrometer of the type described in the opening paragraph is known from the article "Der Pyrolaser" by R. Porter, published in Sensor Magazin no. 3, 1990, pp. 13 to 17. This known pyrometer measures the thermal radiation of a surface on which the pyrometer is focused and whose temperature must be measured. During the thermal radiation measurement, the pyrometer collimates measuring radiation from a pulsed laser on the surface. The measuring radiation reflected by the surface towards the pyrometer is detected and the pyrometer determines the value of the emissivity from the intensity of the reflected radiation. The magnitude of the thermal radiation of the surface measured between consecutive laser pulses is corrected for the emissivity, whereafter a corrected temperature of the surface is obtained.

A drawback of the known pyrometer is that it functions only properly if the surface is diffusely reflecting. If the surface reflects specularly and is not perpendicular to the laser beam, measuring radiation will not reflect in the pyrometer and the pyrometer will then erroneously determine an emissivity of 1. The temperature subsequently determined from the thermal radiation and this emissivity will be too low. It is found that a great many surfaces reflect only a part of incident radiation diffusely and another part specularly. When performing pyrometry on these surfaces, said drawback will thus occur to a greater or lesser extent.

SUMMARY OF THE INVENTION

It is an object of the invention to provide a pyrometer which functions satisfactorily for both diffusely and specularly reflecting surfaces.

To this end the pyrometer according to the invention is characterized in that an optical integrator is arranged in the radiation path of the measuring radiation between the radiation source and the measuring radiation detector. The optical integrator provides the possibility of both irradiating the surface from a given direction by means of the measuring radiation and measuring the reflection over the spatial angle of a hemisphere, and of diffusely irradiating the surface and measuring the reflection in a given direction. A determination of the reflection coefficient from the ratio between the reflected and the incident measuring radiation is now independent of the fact whether the surface reflects diffusely or specularly. This reflection measurement over the spatial angle of the hemisphere leads to a correct value of the emissivity, hence to a correct determination of the temperature of the surface.

A preferred embodiment of the pyrometer is characterized in that the optical integrator is an Ulbricht sphere which has a first aperture as an inlet for the measuring radiation of the radiation source, a second aperture, located adjacent the object surface, as an outlet for measuring radiation towards the surface and as an inlet for radiation reflected by the surface, and a third aperture as an outlet for radiation reflected by the object surface and radiation let in through the second aperture.

The pyrometer according to the invention is preferably characterized in that the thermal radiation detector and the measuring radiation detector are constituted by one common detector. Consequently, the emissivity is determined in the same wavelength range as the thermal radiation so that no extra measures are necessary to correct the emissivity for its wavelength dependence.

An embodiment of the pyrometer according to the invention is characterized in that the measuring radiation diffusely irradiates the surface and in that shielding means are provided to cause only radiation directly originating from the surface to be incident on the detector. The diffuse irradiation of the surface has the advantage that the surface does not reflect a directed beam which is not incident on the detector at a given orientation of the surface, for example, because the reflected beam returns to the source supplying the measuring radiation. When the reflected radiation is being measured, measuring radiation which is not reflected on the surface must not be incident on the measuring radiation detector because this influences the measurement detrimentally. To this end one or more partitions shielding the detector from the radiation not reflected on the surface may be arranged in the Ulbricht sphere. An optical system imaging the surface on the detector is preferably used. This system shields the detector from a large part of said radiation and, moreover, concentrates the thermal radiation of the surface on the detector. Small areas may also be measured without disturbing influences by the surroundings of the area to be measured.

The integrating action of the Ulbricht sphere decreases the intensity of the radiation incident on the detector. The pyrometer according to the invention is therefore preferably characterized by a modulator for amplitude-modulating the measuring radiation supplied by the radiation source and by a synchronous amplifier connected to the output of the measuring radiation detector, which amplifier has an input connected to a control signal generator for the modulator. With such a synchronous detection it is possible to separate small signals from a large quantity of noise and to distinguish between the thermal radiation and the measuring radiation.

A special embodiment of the pyrometer according to the invention is characterized by a modulator, arranged in the radiation path between the object surface and the detector, for amplitude-modulating the radiation received by the detector, and by a synchronous detection circuit connected to the output of the detector, which detection circuit has an input connected to the control signal generator for the modulator. This provides the possibility of using a detector which derives both the intensity of the thermal radiation and the intensity of the reflected measuring radiation from the output signal of the detector by means of synchronous detection. Both signals can then be measured in an AC-coupled channel. Consequently, the DC offsets which often occur in the detectors no longer have any influence on the measured values.

The invention also relates to a laser processing apparatus comprising a radiation source supplying a processing beam and a pyrometer in one of the embodiments described hereinbefore. This apparatus is characterized by directing means for directly directing the processing beam onto the object surface. The pyrometer according to the invention is very suitable for use in a laser processing apparatus. In this apparatus a small area of a surface is heated by a laser, for example, for the purpose of soldering or chemical processing. The temperature of this area of the surface can be measured by the pyrometer during the heat treatment, with the temperature being corrected for the instantaneous value of the emissivity. The directing means may comprise lenses and mirrors.

The laser processing apparatus may be further characterized in that the pyrometer forms part of a control device for controlling the quantity of processing radiation on the object surface, and in that the output signal of the pyrometer is applied to a control circuit for the processing laser. The measured temperature is then used to control a heating or cooling means which determines the temperature of the surface. Even if the emissivity of the surface varies considerably within a temperature range to be traversed, the temperature measurement and consequently the control of the temperature will continue to function properly.

BRIEF DESCRIPTION OF THE DRAWINGS

These and other aspects of the invention will be apparent from and elucidated with reference to the embodiments described hereinafter.

In the drawings

DETAILED DESCRIPTION OF THE DRAWINGS

Figure 1:
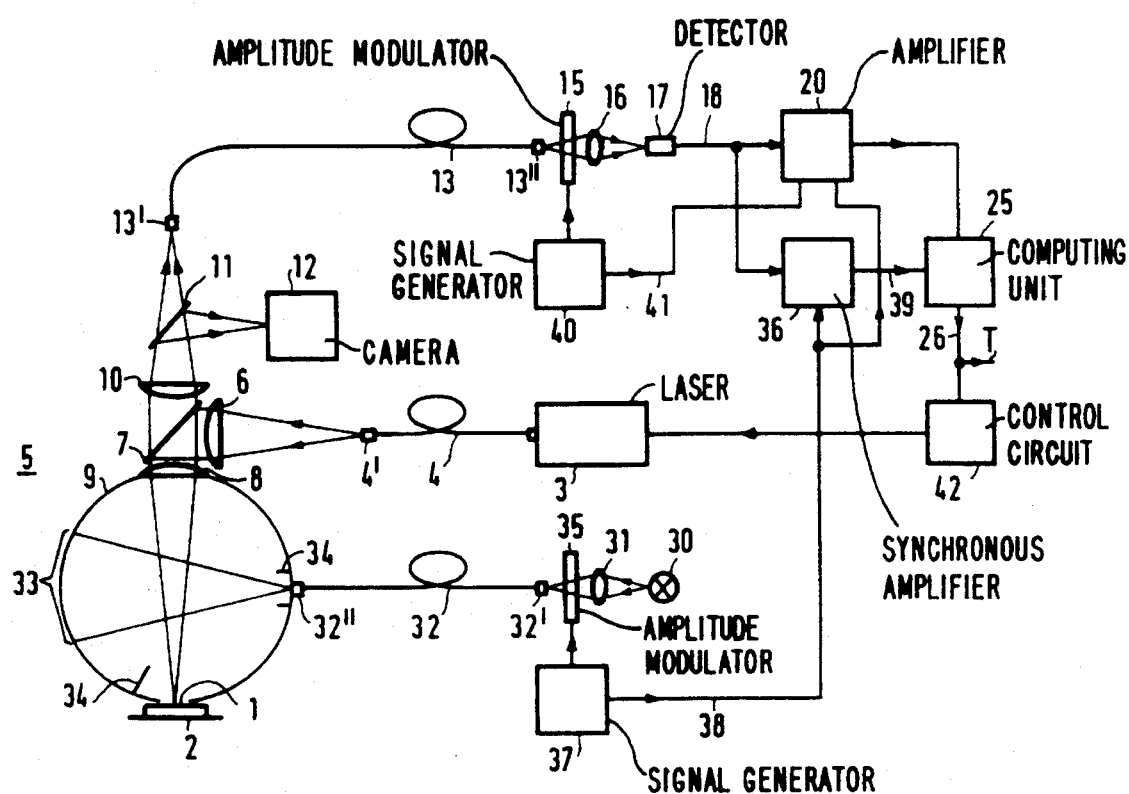
FIG. 1 shows an embodiment of a laser processing apparatus comprising a pyrometer with an Ulbricht sphere.

FIG. 1 shows a laser processing apparatus for processing a surface 1 of an object 2 by means of laser radiation. The processing operation may be a thermal processing operation of the surface so as to establish a chemical reaction or a physical change of the object or its surface. The radiation is generated in a laser 3 which may be a pulsed or a continuous laser. The radiation from the laser is passed, for example via a fibre 4 to an optical head 5 which is arranged above the surface 1 to be processed. By making use of a fibre, the optical head and the laser can be arranged at arbitrary positions with respect to each other. A small optical head 5 which can be rapidly moved can then be used in combination with a heavy, stationary laser 3.

The optical head 5 comprises an optical system for collimating the radiation of the laser 3 onto the surface 1, for checking the surface visually and for performing temperature measurements on the surface. The radiation from the fibre end 4' is received by a lens 6 which, together with a lens 8, collimates the laser radiation onto the surface 1. A wavelength-selective reflector 7 reflecting the laser radiation towards the surface 1 is arranged between the lenses 6 and 8. Visual inspection of the surface 1 is possible because radiation from this surface is passed by the selective reflector 7 at a wavelength which is different from that of the laser 3. To this end the reflector is provided with a vapour-deposited stack of layers reflecting radiation having a narrow wavelength band around the wavelength of the laser and transmitting radiation outside this wavelength band. The radiation passed by the reflector 7 traverses a lens 10 and is incident on a second wavelength-selective reflector 11 which reflects this radiation towards a camera 12. The second reflector has a vapour-deposited stack of layers which reflects visible light and transmits infrared radiation to be described hereinafter. A visible light image of the area of the surface 1 which is being processed can now be picked up by the camera.

The temperature of the surface 1 is measured by means of pyrometry, i.e. by measuring the thermal radiation emitted by the surface. To this end the laser processing apparatus in FIG. 1 is provided with a pyrometer which comprises a part of the elements of the optical head 5, which elements now serve to receive the thermal radiation or infrared radiation, and also comprises a detection unit and an electronic processing circuit. Since the same optical system is used for the laser 3 and the pyrometer, the problem of aligning and keeping aligned the area of the surface 1 whose radiation is measured by the pyrometer and the area which is heated by the processing beam of the laser is automatically solved. Thermal radiation from the surface 1 is concentrated by the lens 8 and reaches the fibre end 13' of a fibre 13 via the first reflector 7, the lens 10 and the second reflector 11. The lens 10 focuses the infrared thermal radiation on the fibre end 13'. The infrared radiation conducting fibre 13 transports the thermal radiation to a detection system arranged opposite the other fibre end 13", which system comprises a lens 16 for concentrating the thermal radiation and an infrared-sensitive detector 17. The detector signal 18 is applied to an amplifier 20. The output signal 21 of this amplifier is applied to an input of a computing unit 25. The computing unit converts the signal 21 into an output signal 26 which represents the temperature T of the surface 1.

The relation between the measured quantity of thermal radiation and the temperature is dependent on the wavelength band within which the radiation is measured, the spatial angle within which the lens 8 receives the thermal radiation, i.e. the aperture of the lens 8, and the emissivity of the surface. The wavelength band is preferably at some distance from the wavelength of the laser so that the thermal radiation which is often weak can still be satisfactorily separated from the strong laser radiation by using satisfactory stack of layers for the reflectors 7 and 11. If the surface is a black body radiator, i.e. a surface having an emissivity of 1, the relation between the quantity of emitted radiation in a given wavelength band and the temperature is defined by Planck's radiation formula or Planck's law. At a lower emissivity of the surface, the quantity of emitted thermal radiation decreases proportionally. In stationary processes it is generally sufficient when the emissivity of the surface is determined once. By means of this value and a known aperture of the lens 8 the computing unit 25 can determine the temperature of the surface from the measured thermal radiation. Since the thermal radiation is measured via the same lens as the lens through which the laser radiation heats the surface 1, the pyrometer measures the temperature of only that part of the surface which is heated by the laser. If desired, the temperature may alternatively be measured at a location next to the area heated by the processing beam by positioning or displacing the fibre end 13' in a controlled manner.

Figure 2:
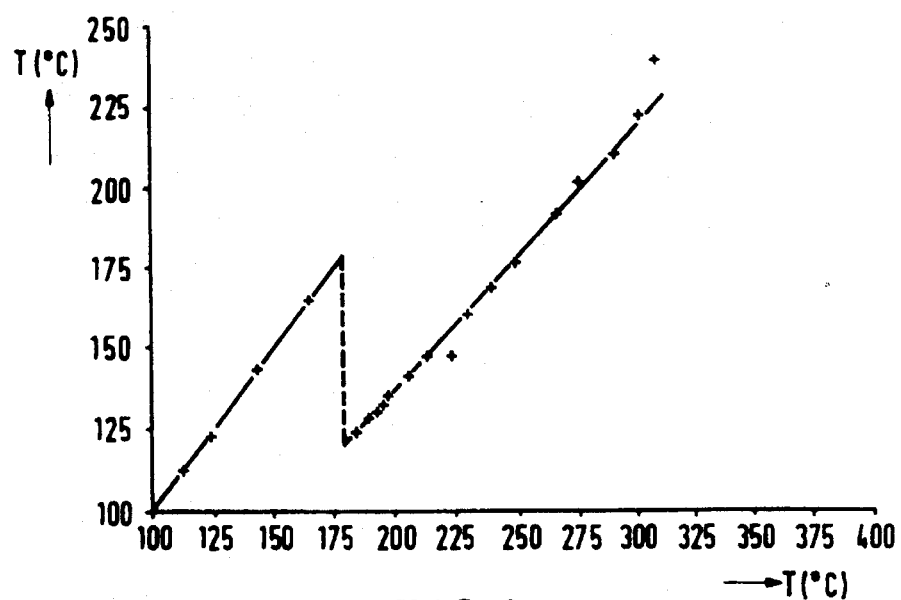
FIG. 2 shows the temperature of the surface of a soldering bath, measured by means of a pyrometer versus the temperature of the soldering bath.

The determination of the temperature from the measured thermal radiation as described in the foregoing paragraph is based on the assumption that the emissivity of the surface does not change during the processing operations. If the emissivity does change, this will give rise to errors in the measured temperature. FIG. 2 shows a measurement illustrating these errors. The temperature of a solder bath measured by means of a contact thermometer is plotted on the horizontal axis. The temperature of the solder surface measured by means of a pyrometer is plotted on the vertical axis. The pyrometer is set at an emissivity of 0.1, as applies to non-molten solder. In the melting range of solder, between 181° and 192° C., the surface changes from a dull to a glossy appearance, i.e. from relatively diffusely reflecting to relatively specularly reflecting. The emissivity then decreases from 0.1 to 0.04. FIG. 2 clearly shows that the temperatures measured by means of the pyrometer above the melting range are approximately 60° C. too low. It is apparent therefrom that the emissivity must be measured for a correct determination of the temperature in processes in which the reflection of the surface to be measured changes.

The pyrometer in the laser processing apparatus of FIG. 1 comprises an emissivity meter. According to the invention the emissivity meter comprises an optical integrator in the form of an Ulbricht sphere 9 which is incorporated in the optical head 5. The Ulbricht sphere has a first aperture at the side, a second aperture at the lower side opposite the surface 1 and a third aperture at the upper side in which or on which the lens 8 is placed. The emissivity meter further comprises an illumination system with a source 30 and a lens 31 coupling measuring radiation from the source into a first fibre end 32' of a fibre 32. The other end 32" of the fibre emits the measuring radiation via the first aperture in the Ulbricht sphere 9 where it is diffusely dispersed by the sphere. The measuring radiation is preferably emitted in such a direction that the surface 1 and the lens 8 are not directly irradiated. In the embodiment of FIG. 1 the fibre 32 irradiates an area 33 of the Ulbricht sphere opposite the fibre end 32". From this area the measuring radiation is diffusely reflected into the Ulbricht sphere. It is possible to arrange shields 34 around the radiating end 32" of the fibre 32 and/or around the area 33, which shields prevent radiation from the fibre from being directly incident on the surface 1 or the lens 8 and cause only radiation directly originating from the surface 1 to be incident on the detector 17. The illumination configuration shown ensures a diffuse illumination of the surface 1. The measuring radiation reflected by this surface is now diffusely distributed over the spatial angle of a hemisphere, irrespective of whether the surface is specularly or diffusely reflecting.

The measuring radiation which is reflected towards the lens 8 by the surface 1 is passed to the detector 17 by means of the lens 8, the reflector 7, the lens 10, the reflector 11, the fibre 13 and the lens 16. The measuring radiation thus follows the same path as the thermal radiation from the surface. This has the advantage that the measuring radiation and the thermal radiation are attenuated to the same extent. Moreover, only a single set of optical components such as the reflectors 7 and 11 needs to be used. The thermal radiation and the measuring radiation are now measured in the same wavelength band. The position and width of the wavelength band can be fixed by means of the stack of layers of the reflector 11 or by means of an additional filter between the surface 1 and the detector 17. For measurements in the wavelength band of between 2 and 4 μm a halogen incandescent lamp is adequate as a source 30 for the infrared measuring radiation.

To be able to distinguish between the contributions of thermal radiation and measuring radiation to the detector signal 18, the measuring radiation is amplitude-modulated at a frequency $f_m$ by means of a, for example mechanical, electro-optical or acousto-optical amplitude modulator 35 arranged between the source 30 and the fibre 32. The detector signal 18 is applied to a synchronous amplifier 36 which also receives a synchronizing signal 38 of the control signal generator 37 from the amplitude modulator 35. The amplitude of the output signal 39 of the synchronous amplifier is a measure of the quantity of measuring radiation received by the detector. This quantity of measuring radiation is proportional to the reflection coefficient of the surface 1. The proportionality constant can be determined by calibrating the emissivity meter with a black body radiator at the position of the surface 1. The emissivity of the surface 1 to be processed is now equal to 1 minus the value of the reflection coefficient. In the computing unit 25 the measured quantity of measuring radiation is multiplied by the proportionality constant so as to obtain the reflection coefficient. Subsequently, the quantity of measured thermal radiation is divided by 1 minus the reflection coefficient, which yields the emissivity-corrected thermal radiation. The thermal radiation is subsequently converted to a temperature in the computing unit 25. The computing unit generates an output signal 26 whose amplitude is a measure of the temperature of the surface 1.

The thermal radiation of the surface is fundamentally a DC value. If a detector 17 is used which is not capable of detecting DC values in a stable manner, for example a PbS detector, a second amplitude modulator 15 upstream of the detector should be used. This amplitude modulator modulates the radiation incident on the detector at a frequency $f_t$, generated by a control signal generator 40. The amplifier 20 to which the detector signal 18 is applied is now a synchronous amplifier which also receives a synchronizing signal 41 from the control signal generator 40. The amplitude of the output signal 21 of the synchronous amplifier is a measure of the quantity of thermal radiation detected by the detector 17. For a satisfactory and independent operation of the two synchronous amplifiers it is recommendable to space the two frequencies $f_m$ and $f_t$ far apart and to avoid that they are multiples of each other or of the mains frequency, or to form multiples of the different frequencies and couple them in phase via two branches of the same synchronous detector.

The quantity of measuring radiation on the detector 17 is generally considerably smaller than the quantity of thermal radiation so that the presence of the measuring radiation does not excessively influence the determination of the temperature. However, if the quantity of measuring radiation is relatively large, the temperature measurement can be prevented from being influenced by interrupting the measurement of the detector signal 18 in the synchronous amplifier 20 during the period when measuring radiation is incident on the detector. To this end the synchronizing signal 38 is also applied to the synchronous amplifier 20.

In the embodiment of the pyrometer shown in FIG. 1 the source for the measuring radiation is an incandescent lamp. However, it is alternatively possible to use a laser as a source. Since the wavelength band of a laser is considerably narrower than the wavelength band within which the thermal radiation is measured, it should be assumed during the determination of the emissivity that the emissivity value determined by means of the laser measuring radiation is equal to the mean value of the emissivity over the wavelength range within which the thermal radiation is measured. The emissivity can now be measured by pulsing the measuring radiation and by measuring the radiation reflected by the surface 1 by means of detector 17 at three instants: just before a pulse, during the pulse and immediately afterwards. The average of the measured values before and after the pulse is a measure of the thermal radiation of the surface 1, while the value during the pulse, reduced by said average, is a measure of the emissivity of the surface.

The pyrometer according to the invention may also be provided with an extra detector and a wavelength-selective reflector arranged between the reflector 11 and the fibre end 13' with which a second thermal radiation measurement can be performed in an analogous manner as described hereinbefore so that the thermal radiation can be measured in two distinct wavelength ranges. A measure of the temperature of the surface can then be determined from the two measured values of the thermal radiation.

Figure 3A:
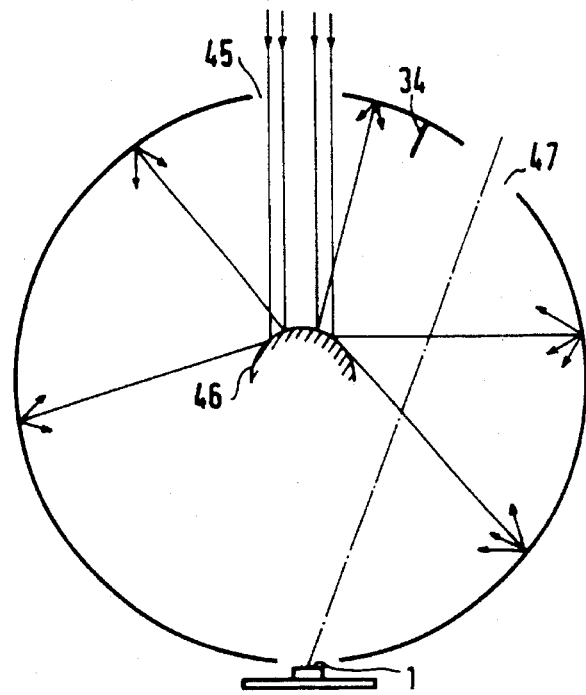
FIG. 3a shows an optical integrator with an internal diffusor and FIG. 3b shows a further embodiment of the optical integrator.
Figure 3B:
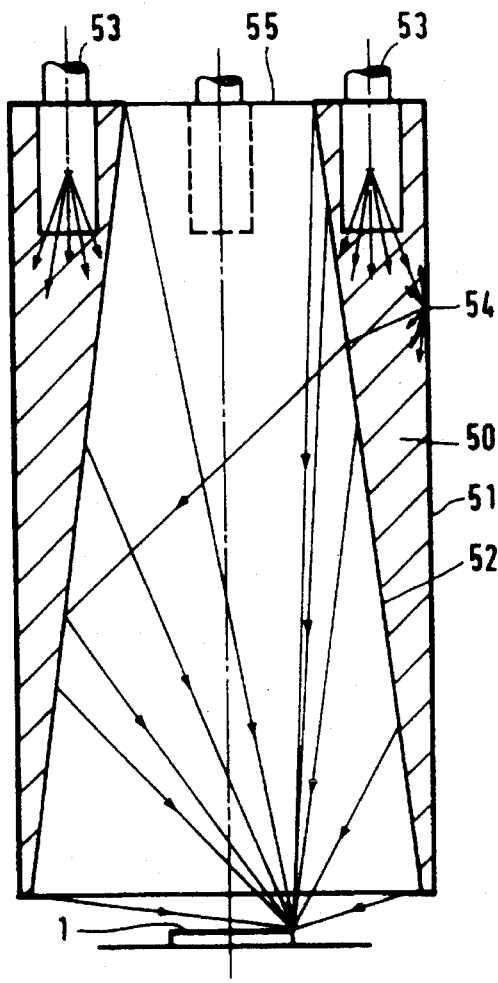

The optical integrator in FIG. 1 is shown as an Ulbricht sphere 9. FIG. 3a shows a modification of the Ulbricht sphere. The measuring radiation is let into the Ulbricht sphere through a first aperture 45 and subsequently dispersed through the sphere by means of a diffusor 46 placed in the sphere, which diffusor also shields the surface 1 from directly incident measuring radiation. The surface 1 opposite a second aperture of the sphere is now diffusely illuminated by the measuring radiation. Radiation reflected by the surface is measured through a third aperture 47 of the sphere. It will be evident that any body convening a beam of radiation into a diffuse beam over the spatial angle of a hemisphere can be used as an optical integrator, such as bodies having right angles and cylindrical or funnel-shaped parts. An embodiment of a cylindrical integrator is shown in FIG. 3b. The integrator comprises a tubular transparent body 50 having a cylindrical outer wall 51 and a conical inner wall 52 upwardly decreasing in diameter. The measuring radiation is coupled into the body at the upper side by means of fibres 53. The measuring radiation from the fibres which is directly incident on the inner wall 52 is largely reflected towards the outer wall by total internal reflection. The outer wall has a scattering layer, for example white paint, so that the incident radiation is diffusely reflected as is shown in the Figure for a single point 54 on the outer wall. A large part of the diffusely reflected radiation is passed by the inner wall 52. In this way a satisfactory uniformity of the radiation intensity is obtained at the lower side of the integrator at the location of the surface 1 to be measured. The radiation from the surface can be measured through the aperture 55 at the upper side of the integrator and a processing beam may be directed through the aperture onto the surface.

The pyrometer according to the invention has been explained with reference to its applications in a laser processing apparatus. However, it will be evident that the pyrometer has a wider field of application. It can be used to advantage wherever the temperature of a surface must be measured whose emissivity does not have a constant value with respect to time or position. A surface may have a position-dependent emissivity if it is formed by components made of materials having, for example different reflection coefficients. Temperature measurements with the pyrometer may be used to monitor or control processes.

FIG. 1 shows how the temperature measured by means of the pyrometer can be used to control the temperature of the surface. In the laser processing apparatus the signal 26 representing the measured temperature is to this end applied to a control circuit 42. A desired temperature, which is compared with the measured temperature, can be set in the control circuit. The difference between the two temperatures is subsequently applied as a control signal to the laser 3 where it controls the intensity of the processing beam or the duration of the pulses of this beam. If the surface is not heated by means of a laser but, for example by means of resistive or inductive heating, the pyrometer may be used in the same manner for monitoring and controlling the heating process.

The pyrometer according to the invention is very suitable for use in a laser soldering apparatus. In such an apparatus a laser beam is used for heating a small portion of the surface of a printed circuit board provided with an electric contact and a quantity of fixed solder. The solder melts when it is heated and after cooling the solder forms a connection between the wiring and the electric contact. By measuring the changing reflection coefficient of the solder it is possible to control the laser power on the solder and the contact in such a way that there is a constant flow of heat in the solder and the electric contact so that the components are evenly heated. The measured temperature may further be used to determine the end of the heating step in such a way that the highest temperature of the solder exceeds the melting point of solder and falls below the temperature at which the electric contact or components connected thereto are damaged. The heating is thereby automatically adapted to the size of the components to be heated. This results in a uniform quality of the solderings, independently of the sizes of the soldered components.

The pyrometer may alternatively be used for controlling the temperature in a laser-chemical vapour-deposition (L-CVD) apparatus. In this apparatus a surface is heated by means of a laser beam so that gases above the surface react and precipitate as a layer on the surface. The temperature control is essential in this case, because the reaction does not take place at a temperature which is too low, while the surface or the layer is damaged at a temperature which is too high. Due to the reflection coefficient changing during the process, a pyrometer cannot be used without an emissivity meter is impractical. For example, when a dull layer is deposited on a smooth metal surface, the reflection will change from specular to diffuse, which causes great measuring problems in the known pyrometers but does not cause any problem at all in the pyrometer according to the invention.

The pyrometer according to the invention may further be used in laser processing apparatus for cutting and welding materials having a high reflection coefficient and for curing thin layers on substrates. The use of the pyrometer yields an improvement of the processing operation and a higher quality of the products processed.

I claim:

1. A pyrometer for measuring thermal radiation and emissivity for both diffusely and specularly reflecting surfaces of an object comprising:

a thermal radiation detector, an optical system connected to the thermal radiation detector for concentrating thermal radiation originating from an object surface area on the detector, an emissivity meter connected to the optical system, the meter further comprising a radiation source supplying measuring radiation and a measuring radiation detector for converting the measuring radiation reflected by the object surface into an electrical signal, and an optical integrator adjacent to the object surface area arranged in the radiation path of the measuring radiation between the radiation source and the measuring radiation detector, wherein the radiation source extends to a first aperture of the optical integrator and diffusely irradiates the object surface, the optical integrator further comprising an optical shield system connected to the integrator for preventing measuring radiation from irradiating the object surface area directly.

2. The pyrometer as claimed in claim 1, in which the optical integrator is an Ulbricht sphere which has the first aperture as an inlet for the measuring radiation of the radiation source, a second aperture, located adjacent the object surface, as an outlet for measuring radiation towards the surface and as an inlet for radiation reflected by the surface, and a third aperture as an outlet for radiation reflected by the object surface and radiation let in through the second aperture.

3. The pyrometer as claimed in claim 1, in which the thermal radiation detector and the measuring radiation detector are constituted by one common detector.

4. The pyrometer as claimed in claim 3, in which the detector measures measuring radiation and thermal radiation of the object surface in one and the same wave length range.

5. The pyrometer as claimed in claim 1, in which the optical system is common for the thermal radiation and the measuring radiation, for imaging the object surface area to be measured on the detector.

6. The pyrometer as claimed in claim 1, wherein said optical shielding system connected to the optical integrator also causes only radiation directly originating from the surface to be incident on the detector.

7. The pyrometer as claimed in claim 1, further comprising a modulator for amplitude-modulating the measuring radiation supplied by the radiation source and a synchronous amplifier connected to the output of the measuring radiation detector, which amplifier has an input connected to a control signal generator for the modulator.

8. The pyrometer as claimed in claim 1, further comprising a modulator, arranged in the radiation path between the object surface and the detector, for amplitude-modulating the radiation received by the detector, and a synchronous amplifier connected to the output of the detector, which synchronous amplifier has an input connected to a control signal generator for the modulator.

9. A laser processing apparatus comprising a radiation source supplying a processing beam, an optical head for directly directing the processing beam onto an object surface, and a pyrometer for measuring thermal radiation and emissivity for both diffusely and specularly reflecting surfaces of an object, said pyrometer further comprising:

a thermal radiation detector;

an optical system connected to the thermal radiation detector for concentrating thermal radiation originating from an object surface area on the detector;

an emissivity meter connected to the optical system, the meter further comprising a radiation source supplying measuring radiation and a measuring radiation detector for converting the measuring radiation reflected by the object surface into an electrical signal;

an optical integrator adjacent to the object surface area arranged in the radiation path of the measuring radiation between the radiation source and the measuring radiation detector, wherein the radiation source extends to an aperture of the optical integrator and diffusely irradiates the object surface, and a shield connected to the optical integrator for preventing measuring radiation from irradiating the object surface area directly.

10. The laser processing apparatus as claimed in claim 9, in which the pyrometer forms part of a control device for controlling the quantity of processing radiation on the object surface, and in that the output signal of the pyrometer is applied to a control circuit for the radiation source supplying the processing beam.

11. A method of monitoring and controlling the process of heating a surface, in which the temperature of the surface is measured by a pyrometer comprising:

a thermal radiation detector;

an optical system connected to the thermal radiation detector for concentrating thermal radiation originating from an object surface area on the detector;

an emissivity meter connected to the optical system, the meter further comprising a radiation source supplying measuring radiation and a measuring radiation detector for converting the measuring radiation reflected by the object surface into an electrical signal;

an optical integrator adjacent to the object surface area arranged in the radiation path of the measuring radiation between the radiation source and the measuring radiation detector wherein the radiation source extends to an aperture of the optical integrator and diffusely irradiates the object surface; and a shield connected to the optical integrator for preventing measuring radiation from irradiating the object surface area directly, said temperature being subsequently used for monitoring and controlling the heating process.

\* \* \* \* \*